(No Model.)

W. L. KLING.
HAND PLANTER.

No. 414,320.

Patented Nov. 5, 1889.

ATTEST-
Harry L. Amer
J. J. Masson

INVENTOR-
William L. Kling
by E. E. Masson atty

UNITED STATES PATENT OFFICE.

WILLIAM L. KLING, OF EAST ST. CLOUD, MINNESOTA.

HAND-PLANTER.

SPECIFICATION forming part of Letters Patent No. 414,320, dated November 5, 1889.

Application filed March 11, 1889. Serial No. 302,820. (No model.)

*To all whom it may concern:*

Be it known that I, WILLIAM L. KLING, a citizen of the United States of America, residing at East St. Cloud, in the county of Benton and State of Minnesota, have invented certain new and useful Improvements in Hand-Planters, of which the following is a specification, reference being had therein to the accompanying drawings.

My invention relates to certain improvements in that class of implements which are designed for planting corn, cotton-seed, peas, beans, and other seeds at determined distances apart, and which are so constructed that in the act of forming the dibble-holes by pressing their lower end into the soil any given number of seeds is deposited; and the objects of my improvement are to provide a simple, inexpensive, and lasting machine, as hereinafter described, and pointed out in the claim. I attain these objects by the construction illustrated in the accompanying drawings, in which—

Figure 1:
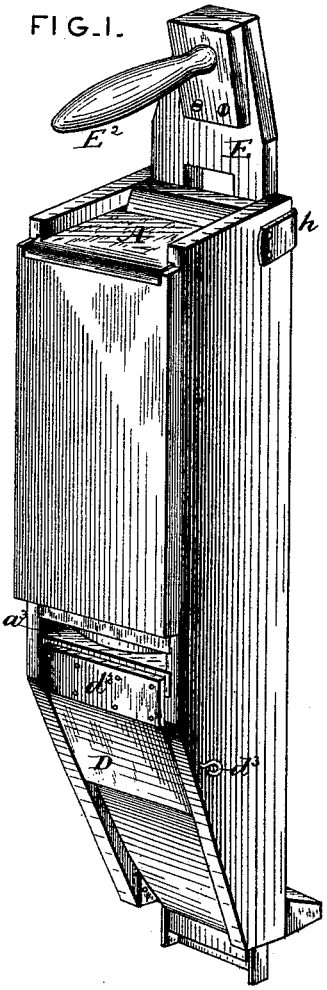
Figure 2:
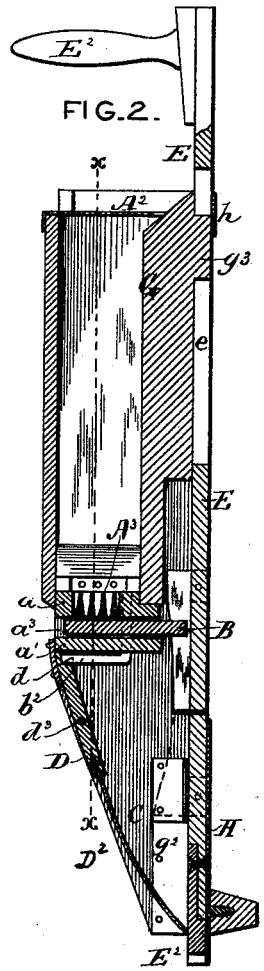
Figure 3:
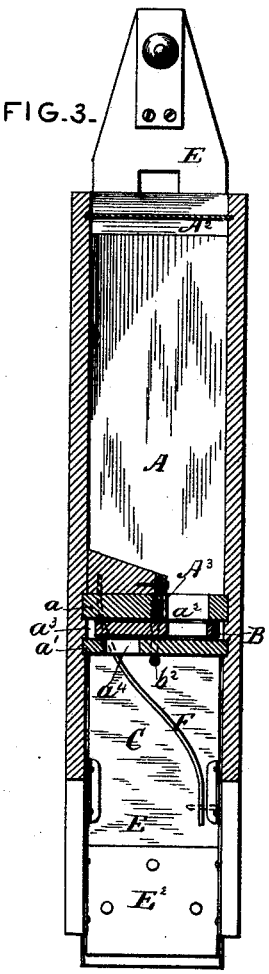
Figure 4:
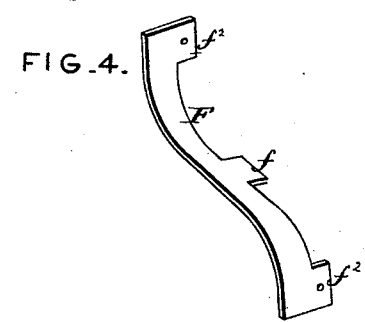
Figure 5:
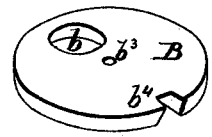

Figure 1 is a perspective view of a hand-planter constructed in accordance with my invention. Fig. 2 is a longitudinal vertical section of the same. Fig. 3 is a transverse vertical section of the same on line $x\ x$ of Fig. 2. Fig. 4 is a detached view, in perspective, of the curved guide to operate the seed-feeding wheel. Fig. 5 is a perspective view of one of the seed-wheels.

In said drawings, A represents the seed chamber or hopper, in the bottom of which there is a horizontal partition $a$, having an opening $a^2$, capable of accommodating the largest number of seeds intended to be planted in a hill. Below said partition $a$ there is another partition $a'$, and between them a horizontal groove $a^3$, within which is placed one of the seed-wheels B furnished with the machine, each wheel B having a different-sized seed-receiving hole $b$ for different kinds of seed, and the lower partition $a'$ has also a hole $a^4$ for the passage of the seed from the wheel B; but said hole $a^4$ does not coincide with the hole $a^2$ in the upper partition. To permit the seeds to pass from the seed-chamber A to the delivery-chamber $c$, the said wheel B has to be horizontally oscillated so that its seed-receiving hole $b$ will coincide first with the opening $a^2$, and after said hole $b$ has been filled with seed it is oscillated until the hole $b$ coincides with the hole $a^4$ in the wheel-supporting partition $a'$. The seed-wheel is mounted upon a pivot-pin $b^2$, that is inserted through the lower horizontal partition $a'$ and through the central hole $b^3$ in said wheel. To permit the seed-wheel to be easily removed from the device and replaced by another, the front of the groove $a^3$ is open for the escape of said wheel when its pivot-pin is withdrawn.

To retain the pin $b^2$ and prevent it from dropping out, its lower end is bent laterally and made to enter a cavity $d$ in the hinged side D. Said part D has its upper end hinged at $d^2$ to the edge of the partition $a'$, (in the present case by means of a flexible piece of leather.) The lower end of the side D is formed of a small sheet of elastic sheet metal $D^2$, the lower edge of which bears against the side of the metal shoe $E^2$ of the plunger E. The hinged side D is retained closed by means of a pin $d^3$ passing therethrough and through the sides of the planter.

When it is desired to change the wheel B for another having a different-sized hole $b$, the pin $d^3$ is removed from its seat and the side D swung on its hinge until the pin $b^2$ is released and is withdrawn from the wheel B. The seeder is then inclined to one side and said wheel permitted to drop out of the groove $a^3$. Another seed-wheel having a suitably-sized hole $b$ is then slid into the groove $a^3$ and the pin $b^2$ reinserted in its seat and locked, as above described.

To horizontally oscillate the wheel B, it has in the edge of its periphery a radial groove $b^4$, that is made to straddle the edge of an S-shaped guide-plate F, that is slightly wider at its ends than at the center of its length, to follow the lateral displacement of the seed-wheel. Said plate has a central lug $f$ and a top and a bottom lug $f^2$ to connect it to the inner surface of the plunger E, said lugs being inserted and pinned in grooves in the plunger. To retain and guide said plunger, the sides of the planter are united together at the top by an internal block G and a strap $h$, and at the bottom by internal sheet-metal guides $g^2$ and a wide strap H. The block G has also a tongue $g^3$, that enters a groove $e$ in the plunger E. Said plunger is provided, as usual, with a handle $E^3$, and the seed-box is provided with a cover $A^2$ in the top, and a brush $A^3$ in the bottom to control the seed.

Having now fully described my invention, I claim—

A hand-planter consisting of the seed-chamber having a perforated horizontal partition $a$ in the bottom thereof, a second perforated partition $a'$ under the first, with a groove $a^3$, open on one side between said partitions, and a perforated seed-wheel, a pivot-pin for said wheel, said pin having its lower end bent to one side and in engagement with the hinged sides of the planter, and means for operating the seed-wheel, substantially as described.

In testimony whereof I affix my signature in presence of two witnesses.

WILLIAM L. KLING.

Witnesses:
S. P. HOWARD,
ANDREW C. ROBERTSON.